(12) United States Patent
Mathuni et al.

(10) Patent No.: US 11,275,236 B2
(45) Date of Patent: Mar. 15, 2022

(54) ADJUSTING DEVICE FOR OPTICAL ELEMENT WITH PARASITIC MOTION COUNTERACTION

(71) Applicant: PHYSIK INSTRUMENTE (PI) GMBH & CO. KG, Karlsruhe (DE)

(72) Inventors: Stefan Mathuni, Karlsruhe (DE); Arne Bramigk, Kuppenheim (DE); Harry Marth, Waldbronn (DE); Daniela Troll, Muggensturm (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 118 days.

(21) Appl. No.: 16/620,194

(22) PCT Filed: Jun. 5, 2018

(86) PCT No.: PCT/DE2018/100536
§ 371 (c)(1),
(2) Date: Dec. 6, 2019

(87) PCT Pub. No.: WO2018/224094
PCT Pub. Date: Dec. 13, 2018

(65) Prior Publication Data
US 2020/0088993 A1    Mar. 19, 2020

(30) Foreign Application Priority Data
Jun. 7, 2017 (DE) ...................... 10 2017 112 517.5

(51) Int. Cl.
*G02B 26/08* (2006.01)
(52) U.S. Cl.
CPC ................ *G02B 26/0858* (2013.01)

(58) Field of Classification Search
CPC . G02B 26/0858; G02B 7/1827; G02B 7/1822
(Continued)

(56) References Cited

U.S. PATENT DOCUMENTS 9,304,314 B1 * 4/2016 Knirck ................ H02K 33/18
2004/0105138 A1   6/2004 Billet
(Continued)

FOREIGN PATENT DOCUMENTS

DE        10344178 A1    4/2005
DE     102009037135 A1    2/2011
(Continued)

OTHER PUBLICATIONS

International Search Report (PCT/ISA/210) dated Aug. 22, 2018, by the European Patent Office as the International Searching Authority for International Application No. PCT/DE2018/100536.
(Continued)

*Primary Examiner* — Jennifer D. Carruth
(74) *Attorney, Agent, or Firm* — Buchanan Ingersoll & Rooney PC (57) ABSTRACT

An adjusting device includes a base body, at least two drive elements, and a movable platform. Each of the drive elements abuts against a lever transmission device to perform a defined adjustment motion relative to the base body as a tilting motion about an axis through the platform and/or a translational motion parallel to an axis perpendicular to a platform plane. Joint elements allow for a tilting motion of the platform solely about the tilting axis. A spring element counteracts a parasitic translational motion in the platform plane and/or a parasitic rotatory motion of the platform about an axis of rotation arranged perpendicular to the platform plane due to the adjustment motion.

20 Claims, 8 Drawing Sheets

(58) Field of Classification Search
USPC .................................................. 359/221.2
See application file for complete search history.

(56) References Cited

U.S. PATENT DOCUMENTS

| | | |
|---|---|---|
| 2007/0206297 A1 | 9/2007 | Weber et al. |
| 2008/0007702 A1 | 1/2008 | Kao |
| 2010/0245847 A1 | 9/2010 | Weber et al. |
| 2012/0019798 A1 | 1/2012 | Weber et al. |
| 2012/0145872 A1* | 6/2012 | Heidemann .......... G02B 7/1825 248/486 |
| 2012/0154935 A1 | 6/2012 | Weber et al. |
| 2013/0135760 A1* | 5/2013 | Weber .................. G02B 7/023 359/811 |
| 2013/0286490 A1 | 10/2013 | Weber et al. |
| 2014/0061420 A1 | 3/2014 | Kaufman et al. |
| 2014/0368933 A1 | 12/2014 | Weber et al. |
| 2016/0041360 A1 | 2/2016 | Weber et al. |
| 2017/0351047 A1 | 12/2017 | Weber et al. |
| 2019/0285834 A1* | 9/2019 | Erbe .................... G02B 7/1822 |

FOREIGN PATENT DOCUMENTS

| | | |
|---|---|---|
| JP | 2000338430 A | 12/2000 |
| WO | 02075365 A2 | 9/2002 |
| WO | 2006000352 A1 | 1/2006 |

OTHER PUBLICATIONS

Written Opinion (PCT/ISA/237) dated Aug. 22, 2018, by the European Patent Office as the International Searching Authority for International Application No. PCT/DE2018/100536.

Office Action dated Sep. 21, 2020, by the Israeli Patent Office in corresponding Israeli Patent Application No. 271033. (2 pages).

First Office Action dated Mar. 2, 2021, by the Japanese Patent Office in corresponding Japanese Patent Application No. 2019-567734, and an English Translation of the Office Action. (8 pages).

Office Action dated Apr. 14, 2021, by the Chinese Patent Office in corresponding Chinese Patent Application No. 201880037424.1, and an English Translation of the Office Action. (16 pages).

Office Action (Notice of Preliminary Rejection) dated May 31, 2021, by the Korean Patent Office in corresponding Korean Patent Application No. 10-2019-7038748, and an English Translation of the Office Action. (11 pages).

* cited by examiner

ADJUSTING DEVICE FOR OPTICAL ELEMENT WITH PARASITIC MOTION COUNTERACTION

The invention relates to an adjusting device and the use of such an adjusting device in a tilting mirror unit.

Known from DE 103 44 178 B4 is an adjusting device for an optical element, where the optical element is mounted on a base body by way of a manipulator unit. The manipulator unit there comprises a linear adjusting element and a movable manipulator member, where the linear adjusting element and the movable manipulator member are connected to each other by way of a flexure hinge arrangement. The movable manipulator member itself is connected by way of a further flexure hinge to the manipulator head on which the optical element is arranged by way of a frame ring.

The flexure hinge arrangement is configured in such a way that it acts as a lever reduction, whereby the already small adjustment motions of the linear adjusting element can be converted to even lower and highly precise adjustment motions of the optical element.

The main drawback of the adjusting device known from DE 103 44 178 B4 is the very limited adjustment motion range.

Therefore, it is the object of the invention to provide an adjusting device which enables a greater adjustment range with high accuracy of the adjusting motion.

BRIEF DESCRIPTION OF THE DRAWING

Other features and advantages will become apparent from the following discussion of exemplary embodiments when read in conjunction with the accompanying drawings wherein.

The term "substantially", used several times in the following part of the description in connection with the specification of geometric data such as angles, dimensions, positions, orientations or directions, shall be understood as meaning that the corresponding geometric data can have a deviation of +/−5% as compared to the geometric data respectively specified, where this deviation is due, for example, to manufacturing or assembly tolerances.

The adjusting device according to the invention comprises a base body and a platform movable relative to the base body, where an element, preferably an optical element, to be moved or to be positioned can be attached to the platform. Movement of the platform or the element to be positioned is realized by at least two drive elements, where each of the at least two drive elements engages at its dedicated and associated lever transmission device.

With the lever transmission device, it is possible to convert the very small drive motions of commonly used drive elements—e.g. in the case of drive elements in the form of piezo actuators—to a comparatively large resulting motion.

The drive motion of an associated drive element transmitted by way of the respective lever transmission device is transferred in a frictionless manner to the platform via a joint element connected to the lever transmission device and the platform, so that the platform can perform a defined adjustment motion relative to the base body in the form of a tilting motion about an axis passing through the platform and/or in the form of a translational motion parallel to an axis which is arranged perpendicular to a platform axis defined by the platform. The joint elements allow for a tilting motion of the platform solely about the at least one tilting axis.

Connected to the platform and used to guide the adjustment motion is a spring element which is likewise connected to the base body and counteracts a parasitic translational motion in the platform plane and/or a parasitic rotatory motion of the platform about an axis of axis of rotation which is arranged perpendicular to the platform plane, where said parasitic motions result from the adjustment motion. At the same time, however, the spring element allows for a translational motion in an axis arranged parallel to the axis of rotation. The spring element is a preferably a flat spring or a membrane made of a metallic material, in particular of spring steel.

It can be advantageous to have the platform be made of two parts and comprise a platform upper part, on which an element to be moved by the adjusting device is attachable, and a platform lower part, and the spring element be arranged in a recess corresponding to its shape in the platform lower part and preferably be adhesively bonded to the lower part. An arrangement of the spring element close to the joint elements or close to the pivot point of the platform is thus obtained, resulting, inter alia, in low mechanical stresses in the deformable components. The mass center of gravity of the moving mass ideally coincides with the pivot point of the platform, so that an undesirable parasitic pendulum motion of the platform is prevented or prevented to the degree possible, respectively. Arranging the spring element in a recess of the platform lower part further results in a small and reduced installation space, and the attachment by way of an adhesive bonding process omits the use of further components and therefore reduces the installation effort. In addition to the connection of the spring element to the platform lower part by way of an adhesive bonding process, other types of connection such as soldering or welding are conceivable. Purely mechanical attachment is further also conceivable in which, for example, the spring element rests or is mounted in recesses, e.g. slots, of the platform lower part.

It can also be advantageous to have the spring element comprise a central section and at least two arm sections extending from the central section. This allows for a high guide accuracy in a simple way, where a corresponding spring element at the same time allows for a comparatively large adjustment range with low mechanical stress on the adjusting device.

Furthermore, it can be advantageous to have the joint elements be formed as flexure hinges. Flexure hinges operate friction-free and their deformation entails only a very small hysteresis. In addition, flexure hinges allow for high dynamic of the respective adjustment motion, and their degree of efficiency is high. The use of flexure hinges is therefore advantageous in particular at high demands on the accuracy and speed of the adjusting device according to the invention.

In addition, it can be advantageous to have the joint elements be configured as a pair of leaf springs arranged substantially perpendicular to each other. Leaf springs arranged substantially perpendicular to each other provide low mechanical loads or stresses in the adjusting device under complex force exposure. In particular, leaf springs arranged perpendicular to each other or crossing each other, respectively, can meet the demand for a comparable dynamics and comparable adjustment motions for every respective adjustment or tilting axis.

In addition, it can be advantageous to have the platform be releasably connected to the base body. This is advantageous with regard to a simpler and therefore more cost-effective manufacture of the adjusting device according to the invention. Furthermore, this provides the possibility for the simple exchange of the platform or the element to be positioned that sis associated therewith. An exchange is particularly advantageous if the joint elements are configured to be permanently connected to or formed integrally formed with the platform, because the joint elements are subject to high mechanical load and a respective failure during operation is possible.

Furthermore, it can be advantageous to have the lever transmission device comprise at least two interacting lever sections. This allows the desired transmission ratio to be realized. It is particularly advantageous to have the total lever transmission of the lever transmission device be between 5 and 7 and particularly preferably be 6.25.

It can there be advantageous to have the at least two interacting lever sections be arranged nested in each other. This enables a comparatively large transmission ratio while at the same time requiring little installation space. In other words, a very compact lever transmission device can thus be realized.

In addition, it can be advantageous to have the lever sections be connected to each other by way of at least one flexure hinge. This enables a friction-free and highly dynamic lever transmission device operation.

In addition, it can be advantageous to have the lever transmission device be integrally formed with the base body. This allows a more compact design of the adjusting device while maintaining very low manufacturing tolerances.

It can also be advantageous to have the platform be tiltable about two tilting axes that intersect at a right angle and pass through the platform, and for the adjusting device to have four drive elements and four joint elements in the form of flexure hinges attached to the platform. This expands the field of application of the adjusting device according to the invention.

In particular, it can be advantageous to have the flexure hinges be integrally connected to the platform. This significantly reduces the installation effort.

In addition, it can there be advantageous to have the spring element comprise an annular central section and four arm sections extending therefrom in a star-shaped manner. This allows for high guiding accuracy in a simple way, where a corresponding spring element at the same time allows for a comparatively large adjustment range with low mechanical stress on the adjusting device. A spring element with three or more than four arm sections extending from the central section in a star-shaped manner is also conceivable.

Furthermore, it can be advantageous to have the point of intersection of the two tilting axes, which defines a pivot point, be substantially in the same plane which is defined by the four attachment points of the joint elements to the platform. This results in a low mechanical load in the arm sections and the joint elements.

At a volume of the envelopes of the adjusting device between 55 and 60 cm$^3$, it can also be advantageous to have a tilting motion take place about a tilting angle between 5×10E-6 and 1 degree and/or the translational motion in a range between 1 nm and 200 µm. Even with small dimensions of the adjusting device, in which the volume of the adjusting device or the volume of the envelopes of the adjusting device is correspondingly small, the adjusting device according to the invention allows for comparatively large tilting angles and/or a comparatively large translational motion or deflection of the platform.

In addition, it can be advantageous to have the platform be able to perform the changeover between the minimum and the maximum tilting angle and/or between the minimum and the maximum translational deflection at a frequency of up to 200 Hz. The adjusting device according to the invention thus provides high dynamics with respect to the adjustment motions.

The invention also relates to the use of the adjusting device in a tilting mirror unit. Highly dynamic deflection of beam paths within a compact tilting mirror unit of an optical device is then accomplished.

In the following, an embodiment of the invention shall be described on the basis of the appended figures.

Figure 1:
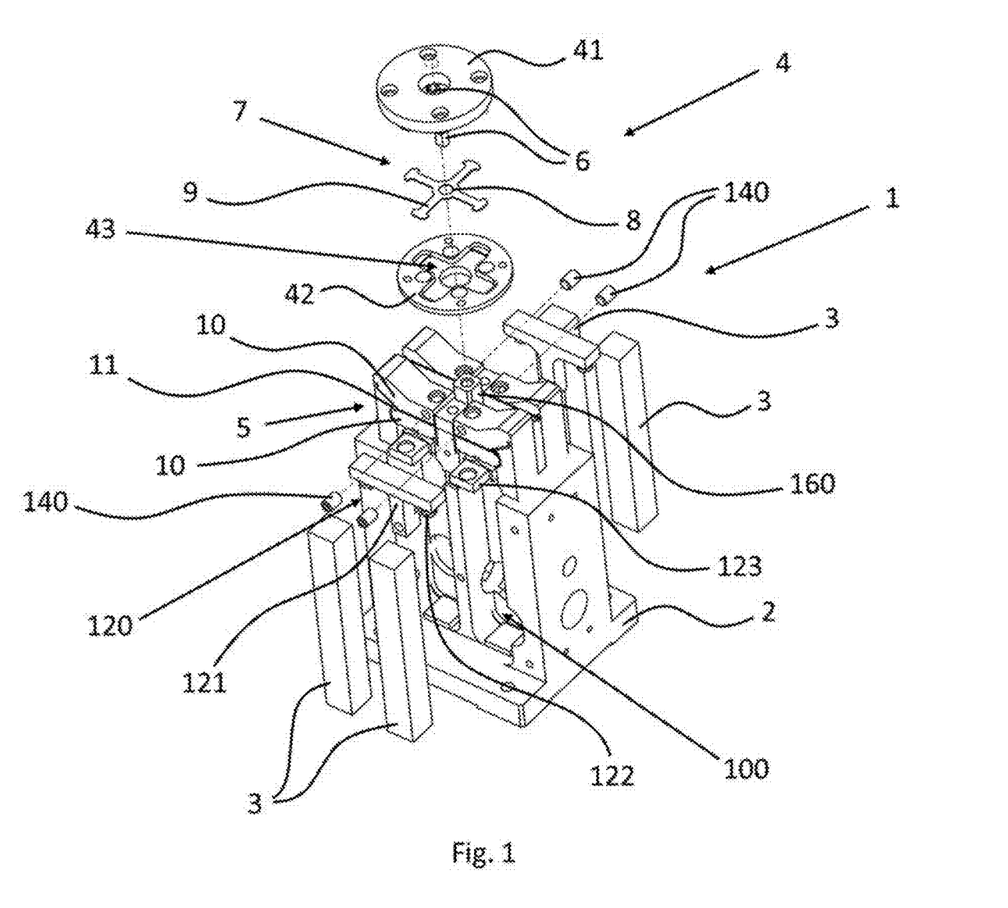
FIG. 1 shows an exemplary embodiment of a disclosed adjusting device in a perspective explosion representation.

FIG. 1 shows an adjusting device 1 according to the invention in a perspective explosion representation. A base body 2 made of titanium Ti6Al4V (grade 5) comprises a total of four base body recesses 100 for the respective reception of a drive element 3 in the form of a piezoelectric linear actuator. The piezoelectric linear actuators are acted upon with a compression stress in the direction of their longitudinal extension by a preload device 120 which comprises a substantially T-shaped preload element 121, two compression springs 122 and bearing sections 123. In the assembled state of the adjusting device, each compression spring 122 is in part inserted into a corresponding recess of preload element 121 and with one of its two distal ends abuts against preload element 121 or is supported thereagainst. The other distal end of the respective compression spring abuts against respectively associated bearing section 123 or is supported thereagainst, where the bearing section also comprises a respective recess into which the compression spring projects in part. The respective partial projection of the preload element and the bearing section into the recess accomplishes the bearing or guidance of compression springs 122.

Formed integrally or in one part with base body 2 are a total of four lever transmission devices 5, each comprising two lever sections 10 nested in each other which are connected to or in operative connection with each other by way of a flexure hinge 11.

Platform 4 comprises a platform upper part 41 and a platform lower part 42, where a total of four joint elements 6 are formed integrally or in one piece with the platform upper part, of which, however, only two are visible in FIG.

1. Arranged between platform upper part 41 and platform lower part 42 is a spring element 7 made of spring steel, where spring element 7 comprises an annular central section 8 and four arm sections 9 extending from central section 8 in a star-shaped manner. In the assembled or mounted state, spring element 7 comes to rest in the complementary and therefore also star-shaped recess 43 of platform lower part 42 or is preferably connected thereto by adhesive bonding.

Spring element 7 is in the assembled or mounted state connected to the base body by way of an attachment element not shown in FIG. 1, preferably a screw. The attachment element there acts together with attachment member 160 of base body 2. Due to the attachment of spring element 7 to base body 2, entire platform 4 is also connected to base body 2 due to the firm connection between spring element 7 and platform lower part 42 and the firm connection between platform lower part 42 and platform upper part 41.

In the assembled state of the adjusting device, joint elements 6 furthermore project through the corresponding through-passages of platform lower part 42 and project into corresponding recesses of respectively facing lever section 10, where they are each connected by way of an attachment element 140 to corresponding lever section 10.

Figure 2:
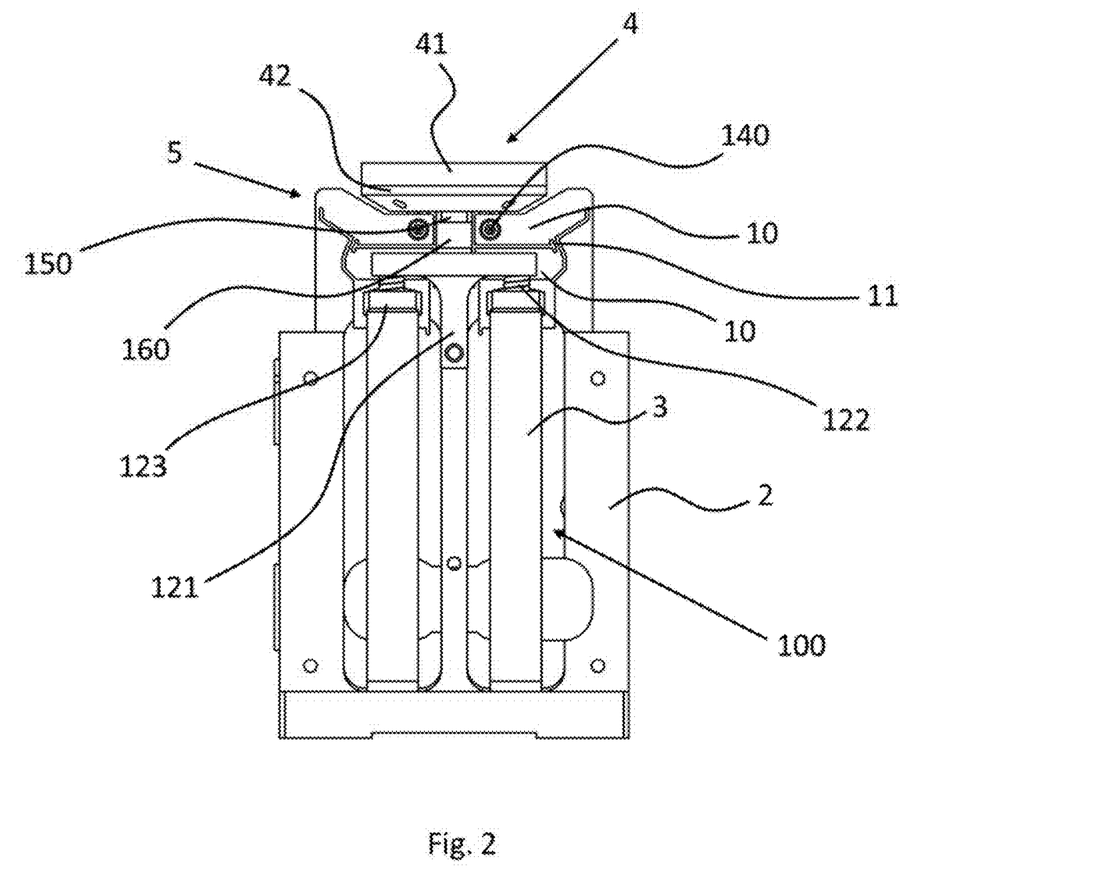
FIG. 2 shows the adjusting device according to FIG. 1 in the assembled state in a side view.

FIG. 2 shows the adjusting device according to FIG. 1 in the assembled state in a side view. Attachment element 150 in the form of a screw, not shown in FIG. 1, which interacts with a corresponding thread in attachment member 160 can be seen there. The head of screw 150, unrecognizable in FIG. 2, there abuts against spring element 7, while the screw or thread shaft protrudes through annular opening 8 of spring element 7. By screwing the screw into the thread of attachment element 150, the spring element and therefore the entire platform is connected to the base body or attached thererto, respectively.

Furthermore, it can be gathered from FIG. 2 that the two recognizable linear actuators 3 each with one of their distal ends abut against respective bearing section 123 of preload device 120, while preload element 121 is connected to the base body and compression spring 122 is arranged between preload element 121 and respective bearing section 123 in such a way that a respective portion comes to rest in the recesses of the preload element and the bearing section. Due to the fact that the preload element is firmly connected to the base body, the compression spring acts in such a way that bearing section 123, which in turn is formed as one part or integrally with an abutment section 101 of lever transmission device 5, is pressed in the direction onto the respective linear actuator. Also abutment section 101 is therefore pressed in the direction of the respective linear actuator, and due to the firm support of the oppositely disposed distal end of the respective linear actuator, the latter is therefore subject to a compressive stress.

The two lever sections 10 are arranged in the longitudinal extension direction of the linear actuators one behind the other, where the lever section facing the linear actuator is shorter than the lever section facing away from the linear actuator. While a lever transmission of about 2 is possible with the shorter lever section, a lever transmission of about 3 can be obtained with the longer lever section. The total lever transmission is approximately 6.25.

Figure 3:
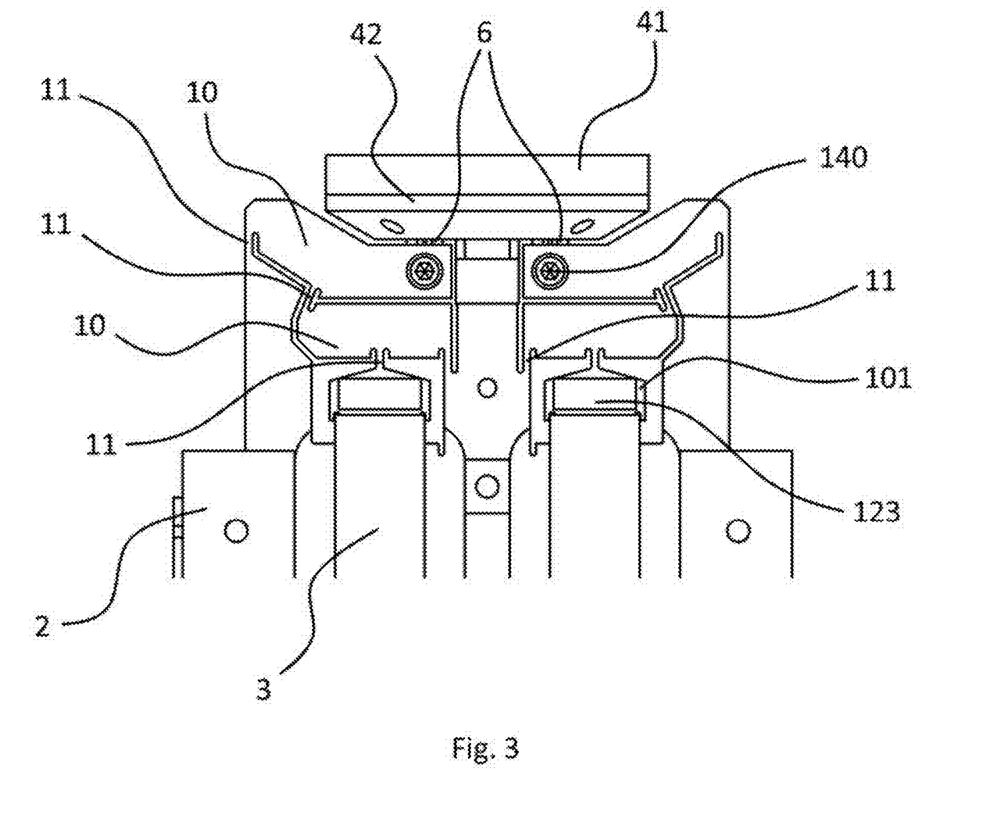
FIG. 3 shows as a detail the upper section of the exemplary adjusting device according to FIGS. 1 and 2.

FIG. 3 shows as a detail the upper section of the adjusting device according to FIGS. 1 and 2, where, however, preload device 120 was omitted for reasons of clarity.

The upper distal end of the respective linear actuator abuts bearing section 123 of the preload device 120 or engages therein, respectively, where bearing section 123 is formed as one part or integrally with abutment section 101 of the lever transmission device.

Adjoining abutment section 101 in a direction facing away from the respective linear actuator is a first flexure hinge 11 of the lever transmission device.

Adjoining the previously described flexure hinge in a direction facing away from the respective linear actuator is a first lever section 10, where this first lever section is, firstly, connected to the base body by way of a further flexure hinge 11, and, secondly, is by way of an additional flexure element 11 connected to a second lever section which is arranged in a direction facing away from the respective linear actuator behind the first lever section.

The first lever section extends over a length of about 8 mm, where this direction of longitudinal extension is arranged substantially perpendicular to the direction of extension of the respectively associated linear actuator.

The second lever section, unlike the first lever section, has an angled shape, where the effective lever length is about 10 mm. The second lever section is connected to the base body by way of a further flexure hinge.

All flexure hinges of the lever transmission device have a length of 1 mm and a width of 0.4 mm.

A connection between the second, longer lever section and respective joint element 6 formed integrally with platform lower part 42 is established by attachment element 140 in the form of a screw.

Figure 4:
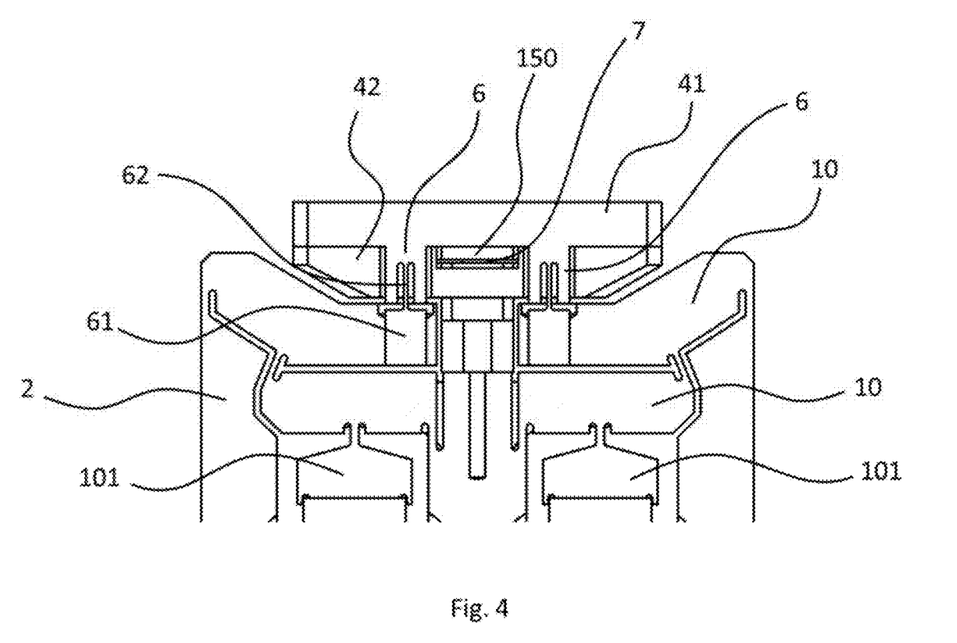
FIG. 4 is a detailed representation based on FIGS. 1 to 3 of the upper part of the exemplary adjusting device.

FIG. 4 is a detailed representation based on FIGS. 1 to 3 of the upper part of the adjusting device, where bearing sections 123 are omitted and joint elements 6 are cut free as compared to subsequent FIG. 3.

It can be gathered from FIG. 4 that each of the two joint elements 6 shown is formed from a pair of leaf springs 61 and 62, where the two leaf springs are arranged substantially perpendicular to each other, thereby enabling the required degrees of freedom in the respective motion or tilting directions arranged substantially perpendicular to each other.

Figure 5:
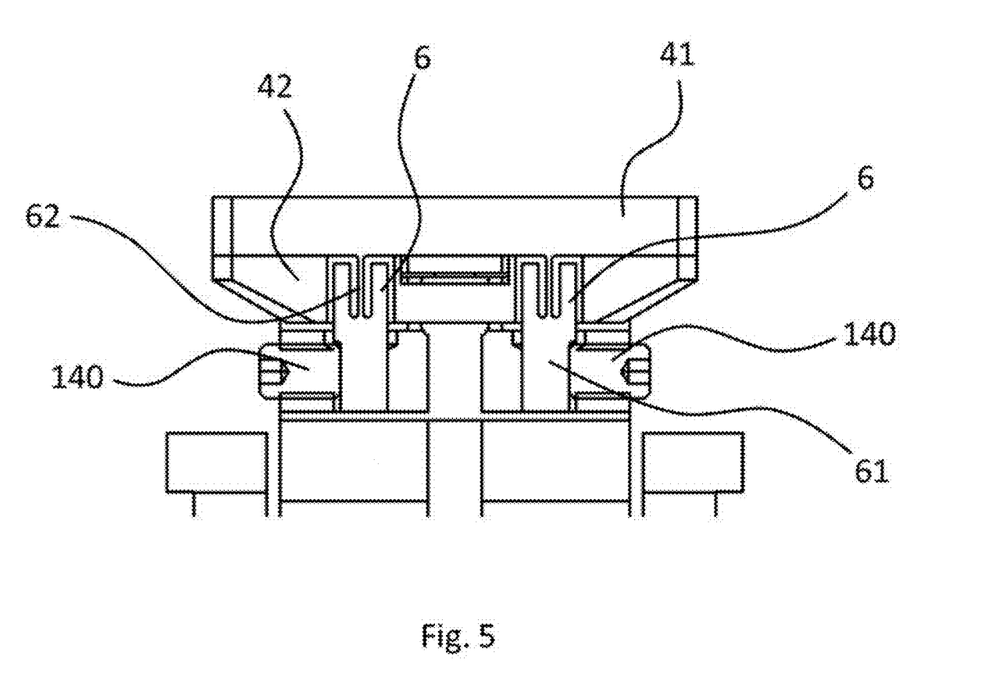
FIG. 5 shows further detail regarding preceding FIGS. 1 to 4.

As mentioned above, each of the joint elements is connected or coupled to the respectively associated lever transmission device by way of an attachment element 140, which is omitted for reasons of clarity in FIG. 4, so that the deflection of the linear actuator transmitted by the lever is transferable to platform 4. This arises from FIG. 5 from a further detail regarding preceding FIGS. 1 to 4. Attachment elements 140 are there configured as grub screws.

Figure 6:
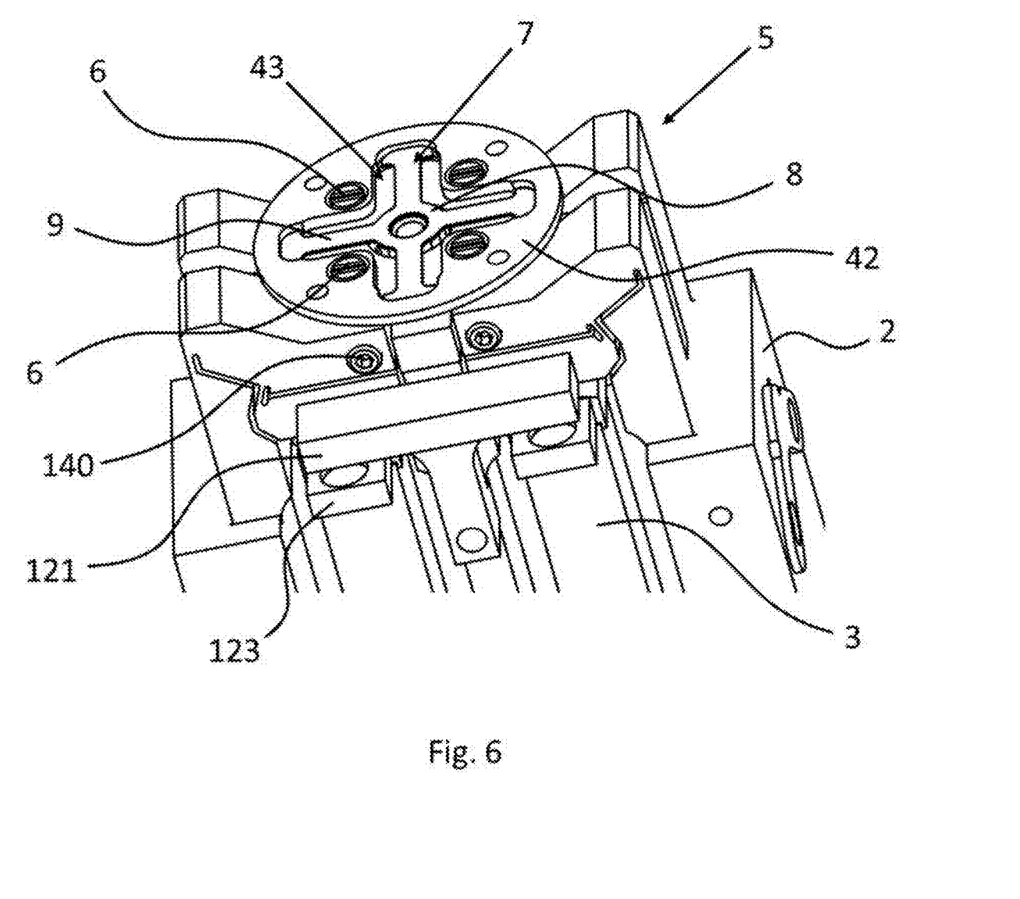
FIG. 6 is a perspective detailed representation of the upper section of the exemplary adjusting device according to FIGS. 1 to 5 with a sectional view through a platform lower part.

FIG. 6 is a perspective detailed representation of the upper section of the adjusting device according to FIGS. 1 to 5 with a sectional view through platform lower part 42, where the sectional view runs parallel to the platform plane. The arrangement of spring element 7 in recess 43 of platform lower part 42 can then be seen in detail.

Cross-shaped spring element 7 comprises an annular central section 8 and four arm sections 9 extending therefrom, where adjacent arm sections each form an angle of substantially 90° among each other.

The spring element is made of spring steel sheet or spring steel, respectively, and has a thickness or material thickness of 0.15 mm. The length of each arm section is 7.5 mm, measured from the center of the circular central section, and the width of each arm section is 1.5 mm at the narrowest point, i.e. the location having a constant width.

Cross-shaped spring element 7 is arranged in complementary recess 43 or inserted therein, respectively, where the wider end section of the respective arm section is adhesively bonded to platform lower part 42.

Figure 7:
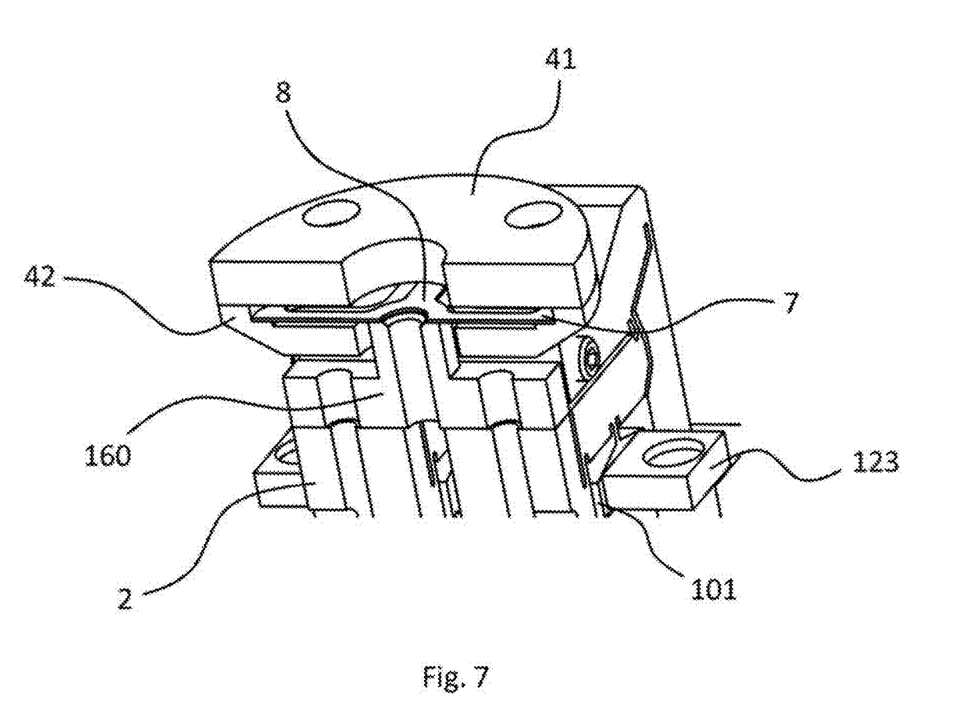
FIG. 7 shows a sectional view perpendicular to the platform plane of the exemplary adjusting device according to FIGS. 1 to 6.

FIG. 7 shows a sectional view perpendicular to the platform plane at an adjusting device according to FIGS. 1 to 6. Clearly recognizable is again the arrangement of spring element 7 between platform upper part 41 and platform lower part 42, where annular central section 8 of the spring element abuts against attachment member 160.

Figure 8:
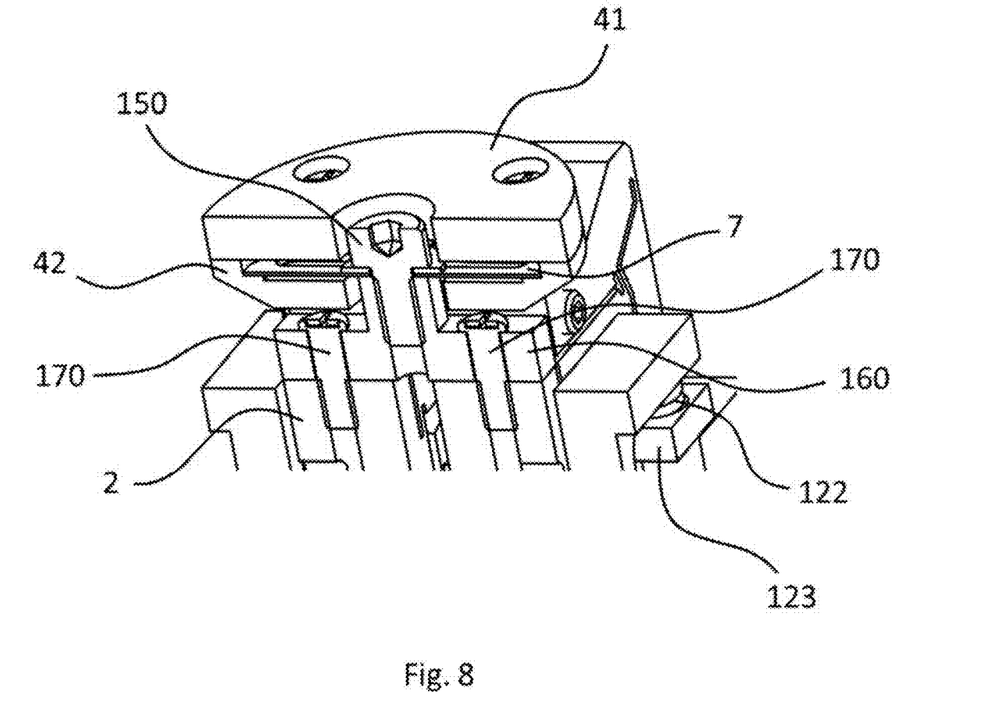
FIG. 8 largely corresponds to FIG. 7 with an attachment element in the form of a screw, and attachment elements configured as screws.

FIG. 8 largely corresponds to FIG. 7, however, shown there is, firstly, attachment element 150 in the form of a screw, and, secondly, attachment elements 170 also configured as screws which connect attachment member 160 to base body 2.

Figure 9:
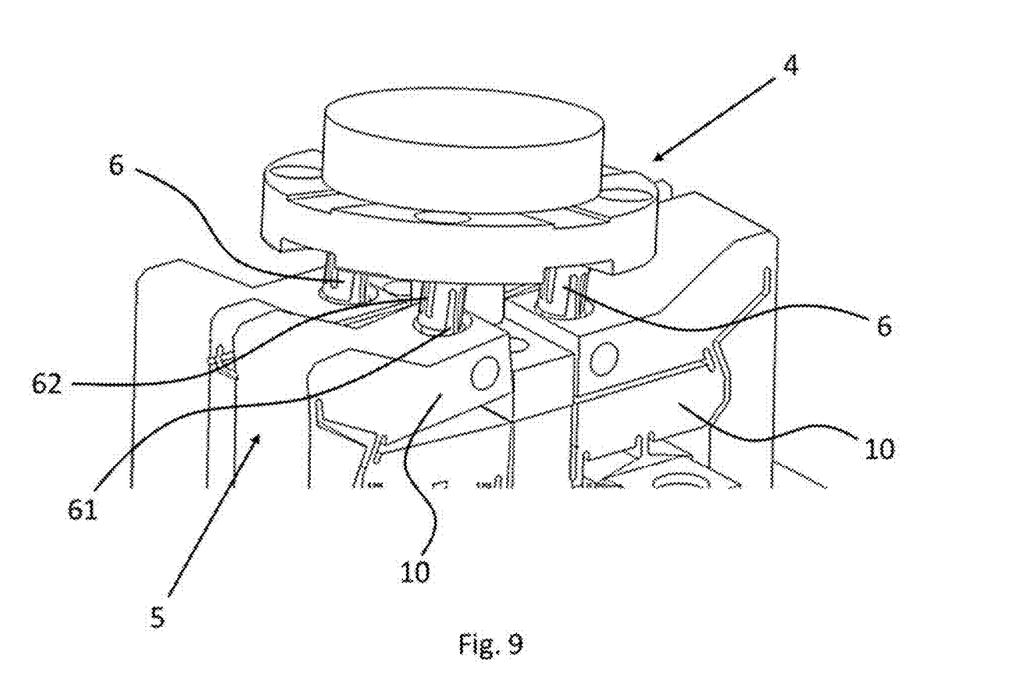
FIG. 9 shows in a perspective representation a deflection or positioning situation of the adjusting device according to FIGS. 1 to 8 simulated by calculation.

FIG. 9 shows in a perspective representation a deflection or positioning situation of the adjusting device according to FIGS. 1 to 8 simulated by calculation, in which the lever transmission device shown in FIG. 9 is deflected at the front left and the lever transmission device disposed diagonally opposite and unrecognizable in FIG. 9 is deflected at the rear right. While the linear actuator associated with the lever transmission device arranged at the front left performs an elongation motion, the linear actuator disposed diagonally oppositely performs a contraction motion. Overall, this results in a defined tilt process about two tilting axes.

It is to be borne in mind in the illustration of FIG. 9 that the deflections or deformations shown are much larger than in reality. This also applies to the illustration in FIG. 10 which is a side view regarding the deflection situation according to FIG. 9.

Figure 10:
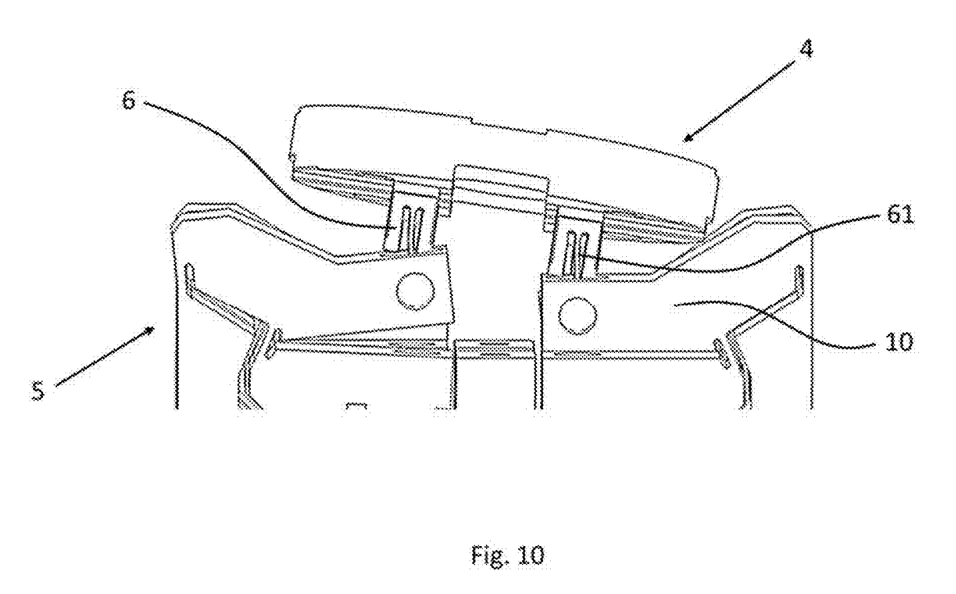
FIG. 10 shows that, with the elongation of the associated linear actuator, the lever transmission device at the front left performs a correspondingly enlarged motion upwardly.

Clearly recognizable in FIG. 10 is that, with the elongation of the associated linear actuator, the lever transmission device at the front left performs a correspondingly enlarged motion upwardly, i.e. in a direction towards the platform, while with the contraction of the linear actuator disposed diagonally oppositely results in a downward motion of the lever transmission device, i.e. in a direction facing away from the platform. Also clearly recognizable in FIG. 10 is the bending deformation of leaf spring 61 due to the corresponding deflections of the two actuated lever transmission devices.

LIST OF REFERENCE NUMERALS 1 adjusting device
2 base body
3 drive element
4 platform
5 lever transmission device
6 joint element
7 spring element
8 central section
9 arm section
10 lever section
11 flexure hinge
41 platform upper part
42 platform lower part
43 recess (of platform 4)
61 leaf spring
62 leaf spring
100 base body recess
101 abutment section
120 preload device
121 preload element
122 compression spring
123 bearing section
140 attachment element
150 attachment element
160 attachment member
170 attachment element

The invention claimed is:

1. Adjusting device comprising:
a base body;
at least two drive elements for realizing a drive motion;
a platform movable relative to said base body, where each drive element abuts against a lever transmission device that is associated with the drive element, and the drive motion of a drive element to be transmitted with said lever transmission device is transferable to said platform via a joint element connected to said lever transmission device and said platform, said platform being configured to perform a defined adjustment motion relative to said base body as a tilting motion about an axis passing through said platform, and/or as translational motion parallel to an axis which is arranged perpendicular to a platform plane defined by said platform, said joint elements being configured to provide a tilting motion of said platform solely about the at least one tilting axis; and
a spring element for guiding the adjustment motion and firmly connected to said base body, said spring element being arranged at said platform, said spring element being arranged to counteract a parasitic translational motion in the platform plane and/or a parasitic rotatory motion of said platform about an axis of rotation arranged perpendicular to the platform plane due to the adjustment motion.

2. Adjusting device according to claim 1, wherein said platform is made of two parts, and comprises:
a platform upper part, on which an element to be moved by said adjusting device is attachable; and
a platform lower part, said spring element being arranged in a recess corresponding to its shape in said platform lower part and adhesively bonded to said platform lower part.

3. Adjusting device according to claim 1 wherein the spring element comprises:
a central section; and
at least two arm sections extending from said central section.

4. Adjusting device according to claim 1, wherein said joint elements are configured as flexure hinges.

5. Adjusting device according to claim 4, wherein each of said joint elements is configured as a pair of leaf springs arranged substantially perpendicular to each other.

6. Adjusting device according to claim 1, wherein said platform is releasably connected to said base body.

7. Adjusting device according to claim 1, wherein said lever transmission device comprises:
at least two interacting lever sections.

8. Adjusting device according to claim 7, wherein said at least two interacting lever sections are arranged nested in each other.

9. Adjusting device according to claim 8, wherein said lever sections are connected to each other by way of at least one flexure hinge.

10. Adjusting device according to claim 7, wherein said lever transmission device is formed integrally with said base body.

11. Adjusting device according to claim 10, wherein a total lever transmission ratio of said lever transmission device is between 5 and 7.

12. Adjusting device according to claim 11, wherein said platform is configured to be tiltable about two tilting axes that intersect at a right angle and pass through said platform, and said adjusting device comprises:
four drive elements; and four joint elements configured as flexure hinges attached to said platform.

13. Adjusting device according to claim 1, wherein a total lever transmission ratio of said lever transmission device is between 5 and 7.

14. Adjusting device according to claim 1, wherein said platform is configured to be tiltable about two tilting axes that intersect at a right angle and pass through said platform, and said adjusting device comprises:
four drive elements; and
four joint elements configured as flexure hinges attached to said platform.

15. Adjusting device according to claim 14, wherein said flexure hinges are connected integrally to said platform.

16. Adjusting device according to claim 15, wherein said spring element comprises:
an annular central section; and
four arm sections extending therefrom in a star-shaped manner.

17. Adjusting device according to claim 16, wherein a point of intersection of said two tilting axes, which defines a pivot point, is substantially in a same plane which is defined by four attachment points of said joint elements to said platform.

18. Adjusting device according to claim 1, wherein at a volume of envelopes of said adjusting device between 55 and 60 cm$^3$, at least one of a tilting motion tilting angle is between 5×10E−6° and 1°, and a translational motion range is between 1 nm and 200 µm.

19. Adjusting device according to claim 18, wherein said platform is configured to perform changeover between at least one of a minimum and a maximum of the tilting angle and between a minimum and a maximum translational deflection at a frequency of up to 200 Hz.

20. Adjusting device according to claim 1, in combination with:
a tilting mirror unit.

* * * * *